United States Patent
Hanley (10) Patent No.: US 9,390,258 B2
(45) Date of Patent: Jul. 12, 2016

(54) SYSTEMS AND METHODS FOR VERIFYING THE AUTHENTICITY OF AN APPLICATION DURING EXECUTION

(71) Applicant: General Electric Company, Schenectady, NY (US)

(72) Inventor: James Patrick Hanley, Decatur, GA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/333,198

(22) Filed: Jul. 16, 2014

(65) Prior Publication Data
US 2016/0019383 A1  Jan. 21, 2016

(51) Int. Cl.
| G06F 21/00 | (2013.01) |
| --- | --- |
| G06F 21/52 | (2013.01) |
| G06F 21/57 | (2013.01) |
| G06F 21/76 | (2013.01) |
| G06Q 50/06 | (2012.01) |
| G06F 21/62 | (2013.01) |
| G06F 11/30 | (2006.01) |
| G06F 12/14 | (2006.01) |

(52) U.S. Cl.
CPC .............. G06F 21/52 (2013.01); G06F 21/575 (2013.01); G06F 21/62 (2013.01); G06F 21/76 (2013.01); G06Q 50/06 (2013.01); G06F 2221/033 (2013.01); G06F 2221/2107 (2013.01)

(58) Field of Classification Search
None
See application file for complete search history.

(56) References Cited

U.S. PATENT DOCUMENTS

| 8,393,001 | B1 | 3/2013 | Libenzi et al. | |
| --- | --- | --- | --- | --- |
| 2006/0179324 | A1* | 8/2006 | Hatakeyama | 713/187 |
| 2007/0220500 | A1* | 9/2007 | Saunier | 717/162 |
| 2008/0288783 | A1* | 11/2008 | Jansen et al. | 713/189 |
| 2009/0119221 | A1* | 5/2009 | Weston et al. | 705/76 |
| 2012/0210138 | A1* | 8/2012 | Tucker | 713/189 |
| 2012/0216244 | A1* | 8/2012 | Kumar et al. | 726/1 |
| 2013/0151839 | A1* | 6/2013 | Rowles et al. | 713/100 |
| 2014/0066015 | A1* | 3/2014 | Aissi | 455/411 |
| 2014/0156981 | A1* | 6/2014 | Hamid | 713/2 |

FOREIGN PATENT DOCUMENTS

| EP | 0816970 | A2 | 1/1998 |
| --- | --- | --- | --- |
| EP | 1429224 | A1 | 6/2004 |
| EP | 2461264 | A1 | 6/2012 |
| WO | 2010014109 | A1 | 2/2010 |

OTHER PUBLICATIONS

Oxborrow, Mark et al., Room-Temperature Solid-State Maser, Nature Letter, Aug. 15, 2012, Abstract, vol. 488, Issue 7411, Macmillan Publishers Limited, http://www.nature.com/nature/journal/v488/n7411/abs/nature11339.html.

* cited by examiner

Primary Examiner — Shin-Hon Chen
(74) Attorney, Agent, or Firm — Sutherland Asbill & Brennan LLP (57) ABSTRACT

In an embodiment, a system includes an electronic device having memory circuitry configured to store an application comprising a plurality of instructions. The system also includes processing circuitry configured to execute the application and an application authenticity check routine, wherein the application authenticity check routine includes instructions executable by the processing circuitry to use idle processing time to verify an authenticity of the application throughout execution of the application.

19 Claims, 4 Drawing Sheets

SYSTEMS AND METHODS FOR VERIFYING THE AUTHENTICITY OF AN APPLICATION DURING EXECUTION

BACKGROUND

The subject matter disclosed herein relates to electronic processing devices, and, more specifically to verifying the authenticity of instructions being executed by a processor of an electronic device.

Certain modern electronic devices, such as cellular phones, digital video recorders, console gaming systems, and so forth, generally include processing circuitry that executes instructions stored in memory in order for the electronic device to function as intended. For example, certain electronic devices may store and execute firmware instructions that generally define the behavior of the electronic device. In certain situations, these firmware instructions may be stored in the memory of the electronic device at the time the electronic device is manufactured. Additionally, in certain situations, the firmware may be updated over the lifetime of the electronic device to address firmware bugs and/or to augment functionality of the electronic device.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes an electronic device having memory circuitry configured to store an application comprising a plurality of instructions. The system also includes processing circuitry configured to execute the application and an application authenticity check routine, wherein the application authenticity check routine includes instructions executable by the processing circuitry to use idle processing time to verify an authenticity of the application throughout execution of the application.

In another embodiment, a method includes instructing processing circuitry of an electronic device to initiate execution of an application stored in a memory of the electronic device. The method includes executing the application while executing an authenticity check routine using the processor of the electronic device, wherein the authenticity check routine comprises a plurality of instructions configured to cause the processing circuitry to determine whether the application has been modified subsequent to packaging.

In another embodiment, a non-transitory, computer-readable medium stores instructions executable by at least one processor of an electronic device. The instructions include instructions to execute an application stored in at least one memory of the electronic device and instructions to intermittently execute an authenticity check routine while executing the application. The authenticity check routine includes instructions to compute a digest value for the application stored in the at least one memory of the electronic device and instructions to decrypt a portion of the application stored in the at least one memory of the electronic device to determine a stored digest value for the application. The instructions also include instructions to determine that the application is authentic whenever the at least one processor determines that the computed digest value is equal to the stored digest value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As mentioned above, many modern electronic devices store or encode a set of instructions (e.g., applications, modules, routines, firmware, or any other suitable instructions) that are executed by processing circuitry to enable the electronic device to provide its intended functionality. Additionally, in certain areas, electronic devices may operate for extended periods of time without interruption (e.g., without power cycling or rebooting) after installation and/or activation. For example, an industrial monitoring and/or control system may generally include a number of field devices (e.g., sensing devices, relays, actuators, and so forth), which may be deployed throughout a facility and may subsequently operate for an extended period of time (e.g., months to years) after deployment without interruption. As mentioned, these field devices may generally operate by executing instructions, such as executable applications that are stored in a memory circuitry of the device prior to deployment. In general, if the instructions stored within the memory circuitry of an electronic device are modified, the behavior and functionality of the device will also be modified.

With the foregoing in mind, present embodiments enable an electronic device to perform an initial check that verifies the authenticity of stored instructions (e.g., firmware) before execution, such as during a booting sequence. As used herein, a set of instructions is considered "authentic" if the instructions have not been modified after packaging (e.g., assembling, bundling) by the manufacturer or another authorized software provider. As set forth above, since certain electronic devices may not be rebooted for extended periods of time, present embodiments also provide a mechanism whereby the authenticity of the stored application packages may be continually, regularly, or sporadically verified during execution of the stored applications. That is, as set forth below, in certain embodiments, the instructions in an executable application may include an authenticity check routine that is continually, regularly, or sporadically executed by the processing circuitry of the electronic device to determine whether the application has been modified subsequent to packaging. In certain embodiments, the authenticity check routine may be executed by the processing circuitry of the electronic device during otherwise idle processing time, rendering the electronic device more robust to thwart differential power analysis and/or electromagnetic (EM) noise analysis techniques. In certain embodiments, the authenticity check routine may be performed using specialized processing circuitry, such as a high-security module (HSM) or a field-programmable gate array (FPGA) (e.g., a hardware accelerator). Accordingly, present embodiments enable the continual, regular, or sporadic authenticity verification of an application, even as it is actively being executed by the electronic device.

Figure 1:
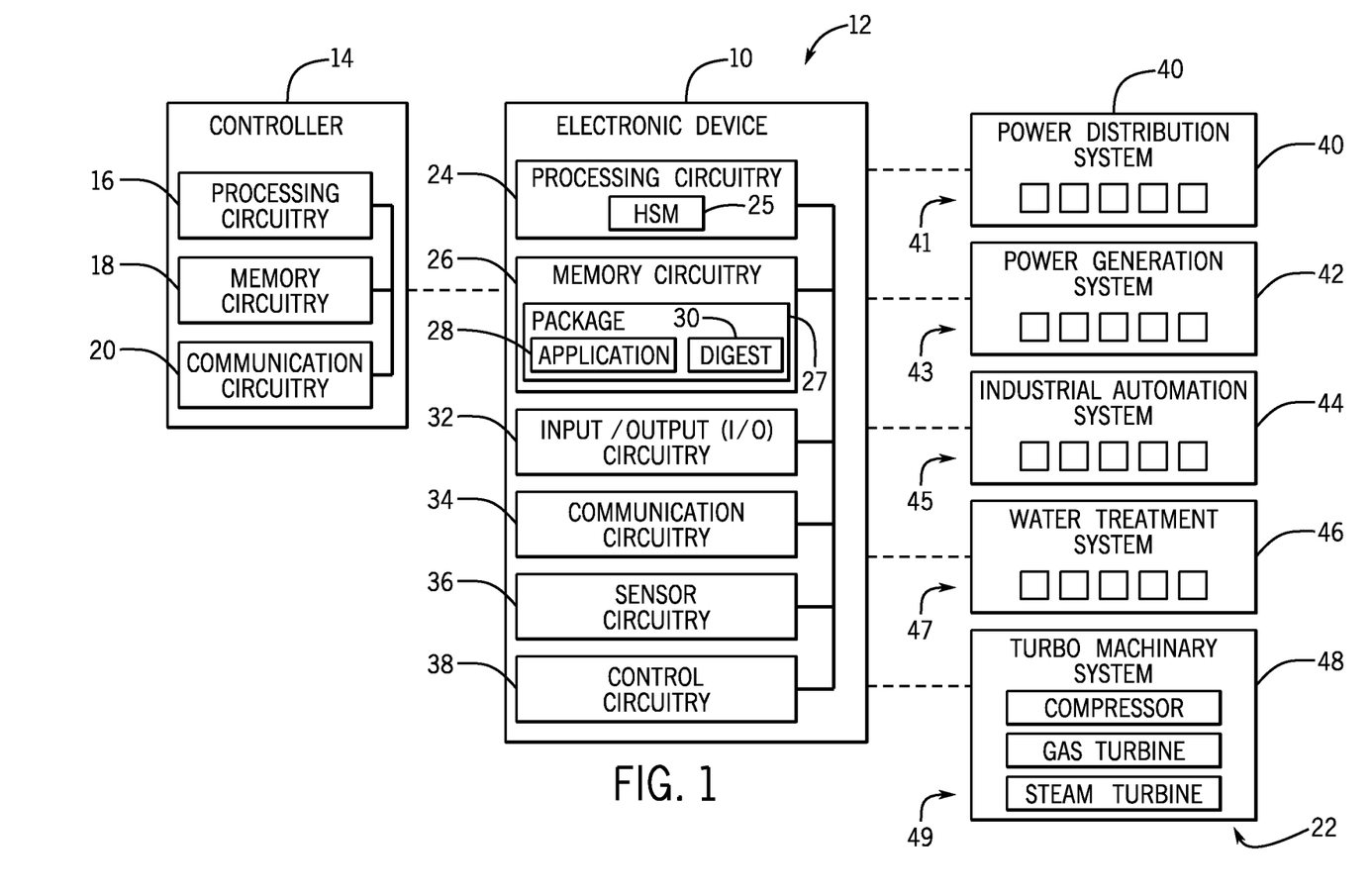
FIG. 1 is a schematic of an electronic device, in accordance with an embodiment of the present approach.

Turning to the drawings, FIG. 1 is a schematic of an electronic device 10, in accordance with an embodiment of the present approach. In certain embodiments, the electronic device 10 may be a consumer device (e.g., a cellular telephone, a tablet computing device, a portable computing device, a desktop computing device, a digital video recorder, a video game console device, a television) or an industrial device (e.g., a relay, an intelligent electronic device (IED), a field device, an end device). In particular, the electronic device 10 illustrated in FIG. 1 is an embodiment of an intelligent electronic device (IED) 10 that is part of an industrial monitoring and/or control system 12. In addition to the electronic device 10, the embodiment of the industrial monitoring and/or control system 12 of FIG. 1 includes a controller 14 that monitors and/or controls the operation of the industrial monitoring and/or control system 12, including the electronic device 10 and various industrial equipment 22. By way of example, the industrial equipment 22 may include a power distribution system 40 having various power distribution components 41 (e.g., transformers, transmission lines, capacitor banks, etc.), a power generation system 42 having various power generation components 43 (e.g., generators, combustors, engines, etc.), an industrial automation system 44 with various automation components 45 (e.g., reactors, conveyor belts, feeders, hoppers, etc.), a water treatment system 46 having various water treatment components 47 (e.g., filters, clarifiers, pH gauges, etc.), and/or a turbomachinery system 48 having various turbomachinery components (e.g., turbines, combustors, compressors, etc.). The illustrated controller 14 generally includes processing circuitry 16, memory circuitry 18, and communication circuitry 20 to enable the controller 14 to manage the industrial monitoring and/or control system 12. It may be appreciated that the illustrated industrial equipment 22 is merely provided as examples of pieces of equipment that may be monitored and/or controlled by the electronic device 10 and the controller 14 of the industrial monitoring and/or control system 12, and that any other suitable piece of equipment (e.g., a combustor, a blower, a reactor, etc.) may be monitored and/or controlled by the industrial monitoring and/or control system 12 in accordance with the present disclosure.

The illustrated electronic device 10 includes processing circuitry 24 (e.g., a general purpose microprocessor, an application-specific integrated circuit (ASIC), or other suitable processing circuitry) that is capable of executing instructions (e.g., executable applications, modules, routines, firmware, and so forth) to provide the desired functionality and behavior of the electronic device 10. In certain embodiments, this processing circuitry 24 may include a high-security module (HSM) 25, discussed in greater detail below, which may enable enhanced security during certain processing activities. In certain embodiments, this processing circuitry 24 may include a field-programmable gate array (FPGA) device, such as a hardware accelerator, that may be programmed when the device is manufactured to perform certain processing tasks during operation of the electronic device 10. For such embodiments, the FPGA may be configured or programmed at a hardware level at the time that the electronic device 10 is manufactured based on instructions (e.g., software code), such that the FPGA performs the functions described by the instructions during operation. Accordingly, for such embodiments, since the instructions are used to program the FPGA, and since these instructions are carried out by the FPGA during operation, the FPGA may be described herein as storing and executing instructions.

The illustrated electronic device 10 includes memory circuitry 26 (e.g., electrically erasable programmable read-only memory (EEPROM), a solid state disk drive, a flash drive, or another suitable non-volatile data storage mechanism) capable of storing the aforementioned instructions for execution by the processing circuitry 24. For example, as illustrated in FIG. 1, the memory circuitry 26 stores a package 27 (e.g., software package 27) that, as discussed in greater detail below, includes an executable application 28 (e.g., software 28) as well as a digest value 30 associated with the executable application 28. As used herein, an application is a set of encoded instructions (e.g., binary encoded instructions) that are executable by the processing circuitry 24 of the electronic device 10.

The illustrated electronic device 10 includes input/output (I/O) circuitry 32 capable of receiving user input via one or more input devices (e.g., touchscreens, pointing devices, keyboards, microphones, accelerometers, and so forth) and/or providing output to the user via one or more output devices (e.g., displays, touchscreens, speakers, indicator lights, printers, and so forth). The illustrated electronic device 10 includes communication circuitry 34 (e.g., a wired or wireless network interface card (NIC)) to enable the electronic device 10 to communicate with other electronic devices (e.g., the controller 14) via a network (e.g., via a local network or via the internet). The components included in the illustrated electronic device 10 are merely provided as examples, and that other embodiments of the electronic device 10 may include additional or fewer components, in accordance with the present disclosure.

Additionally, the illustrated electronic device 10 includes sensor circuitry 36 that enables the electronic device 10 to collect sensory information regarding the performance of the industrial equipment 22. In certain embodiments, the sensor circuitry 36 may include, for example, temperature sensors, pressure sensors, flow sensors, composition sensors (e.g., gas composition sensors, oxygen sensors, exhaust gas sensors, etc.), flame sensors, positional sensors, clearance sensors, vibration sensors, accelerometers, rotational speed sensors, voltage sensors, amperage sensors, frequency sensors, light sensors, sound sensors, or any other suitable sensing elements. By specific example, for the illustrated electronic device 10, the sensor circuitry 36 may include a rotational speed sensor that may be capable of measuring the speed of the turbomachinery 49 (e.g., a drive system of a compressor, a gas turbine, or a steam turbine). That is, the processing circuitry 24 may execute a routine of the application 28 stored in the memory circuitry 26 of the electronic device 10 to determine the speed of the turbomachinery 49 based on measurements collected by the sensor circuitry 36. Further, the electronic device 10 may provide the determined speed of the turbomachinery 49 to the controller 14, via the communication circuitry 34, such that the processing circuitry 16 of the controller 14 may determine the operation parameters or state of the turbomachinery 49, as well as other portions of the industrial monitoring and/or control system 12.

The illustrated electronic device 10 also includes control circuitry 38 that enables the electronic device 10 to provide control signals to the turbomachinery 49 to modulate the performance of the turbomachinery 49 based on instructions from the controller 14. For example, in certain embodiments, the control circuitry 38 may provide output signals that result in either an increase or a decrease in power being supplied to a drive system of a compressor of the turbomachinery system 48, modulating the performance of the compressor. More specifically, if the controller 14 determines that the output of the compressor is too low based on measurements collected by the sensor circuitry 36, then the controller 14 may, via the communication circuitry 34, instruct the electronic device 10 to increase the output of the compressor. In response, the electronic device 10, using the control circuitry 38, may provide control signals to the drive system of the compressor to increase the power supplied to the drive system, thereby increasing the output of the compressor.

As set forth above and discussed in greater detail below, in certain embodiments, the executable applications 28 may be stored in the memory circuitry 26 at the time the electronic device 10 is manufactured and may be updated thereafter to address errors or bugs in the controller 14 and/or to augment functionality of the electronic device 10. However, there are some situations that may result in the modification of the executable application 28 in the memory circuitry 26 of the electronic device 10. One possibility is simple data corruption, wherein a hardware glitch, a cosmic ray collision, or another similar event results in a change (e.g., a single bit swap) in the executable application 28 stored in the memory circuitry 26. Another possibility is that an unauthorized party may intentionally try to alter one or more bits of data in the executable application 28 in an attempt to cause an exception (e.g., a fault) in the electronic device 10, or in an attempt to gain unauthorized access to the electronic device 10. If the unauthorized party can gain physical access to the electronic device 10, this data alteration might be accomplished, for example, by polishing down the integrated circuit (IC) packaging of the memory circuitry 26, and then providing electromagnetic radiation (e.g., laser light) to specific physical locations to alter one or more bits stored in the memory circuitry 26. It should be noted that this example is not intended to be limiting, and that other types of attacks generally involving the application of different types of electromagnetic radiation to the memory circuitry 26 and/or the processing circuitry 24 may also be possible.

As such, in light of such attacks, present embodiments provide a mechanism to verify the authenticity of the application 28 throughout execution of the application 28. That is, rather than only verifying the authenticity of an application before it is executed (e.g., during bootup), present embodiments are able to identify and address even single bit changes to the contents of the application 28 that may occur at any point during the execution of the application 28. Further, it may be noted that the success of the EM attack described above is greater when the unauthorized party can ascertain where (in the memory circuitry 26 and/or the processing circuitry 24) or when (during operation of the electronic device 10) to attack the circuitry of the electronic device 10. As such, certain presently disclosed embodiments enable the processing circuitry 24 of the electronic device 10 to continually be active, continually verifying the authenticity of the application 28, which makes it more difficult for an unauthorized party to plan and implement an attack, rendering the electronic device 10 more secure.

Figure 2:
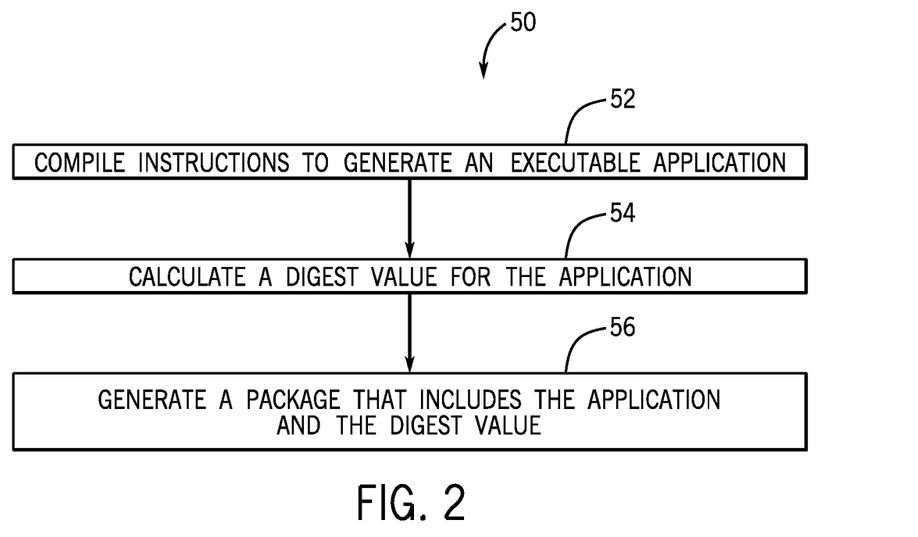
FIG. 2 is a flow diagram illustrating an embodiment of a process for preparing and packaging instructions for execution by the electronic device of FIG. 1.

FIG. 2 is a flow diagram illustrating an embodiment of a process for preparing and packaging instructions for execution by the electronic device of FIG. 1. FIG. 2 illustrates a flow diagram that depicts an embodiment of a computer-implemented process 50 whereby an authorized software provider, such as the manufacturer of the electronic device 10, may generate a package 27 (e.g., a software package 27) for installation in the memory circuitry 26 of the electronic device 10. The illustrated process 50 begins with the authorized software provider compiling (block 52) instructions to generate an executable application 28. For example, using a suitable processing device, a set of human-readable code written in a programming language (e.g., C, C++, Ada, Fortran) may be compiled into a binary executable application 28.

Continuing through the process 50 illustrated in FIG. 2, next a digest value may be calculated (block 54) for the application compiled in block 52. That is, using a suitable processing device, the executable application 28 generated in block 52 may be provided as input to an algorithm that outputs a digest value 30. The digest value 30 may generally be a cryptographic hash value that is computed (e.g., generated or determined) using a cryptographic hash function (e.g., MD4, MD5, SHA-1, SHA-2, SHA-3, SHA-256). As such, the digest value 30 may generally include a fixed-length string that is generated from a bit-wise digestion of the application 28, such that even a single bit difference in the input (e.g., the application 28) yields a different digest value 30.

Subsequently, using a suitable processing device, a package 27 (e.g., a software package 27) may be generated (block 56) that includes the application 30 generated in block 52 as well as the digest value 30 generated in block 54. For example, the package 27 may be a file container (e.g., a zip file, a tar file) that includes a binary executable application file 28 and a text file that includes the digest value 30. In certain embodiments, the package 27 may be compressed such that the package 27 occupies less space in the memory circuitry 26 of the electronic device 10. Further, in certain embodiments, the package 27 may be entirely or partially encrypted. That is, in certain embodiments, a suitable processing device may use an encryption key that is associated with the manufacturer of the electronic device 10, or an encryption key associated with an authorized software provider, to encrypt some or all of the package 27. For example, in certain embodiments, the entire package 27 may be encrypted. In other embodiments, the application 28 and the digest value 30 stored within the package 27 may be individually encrypted. In still other embodiments, the digest value 30 alone may be encrypted before being included in the package 27. Further, as discussed below, for embodiments that utilize encryption, the encryption key used by the manufacturer or the authorized software provider to encrypt the package 27 is associated with corresponding decryption keys stored within the memory circuitry 26 of the electronic device 10, for example, at the time of manufacturing.

Figure 3:
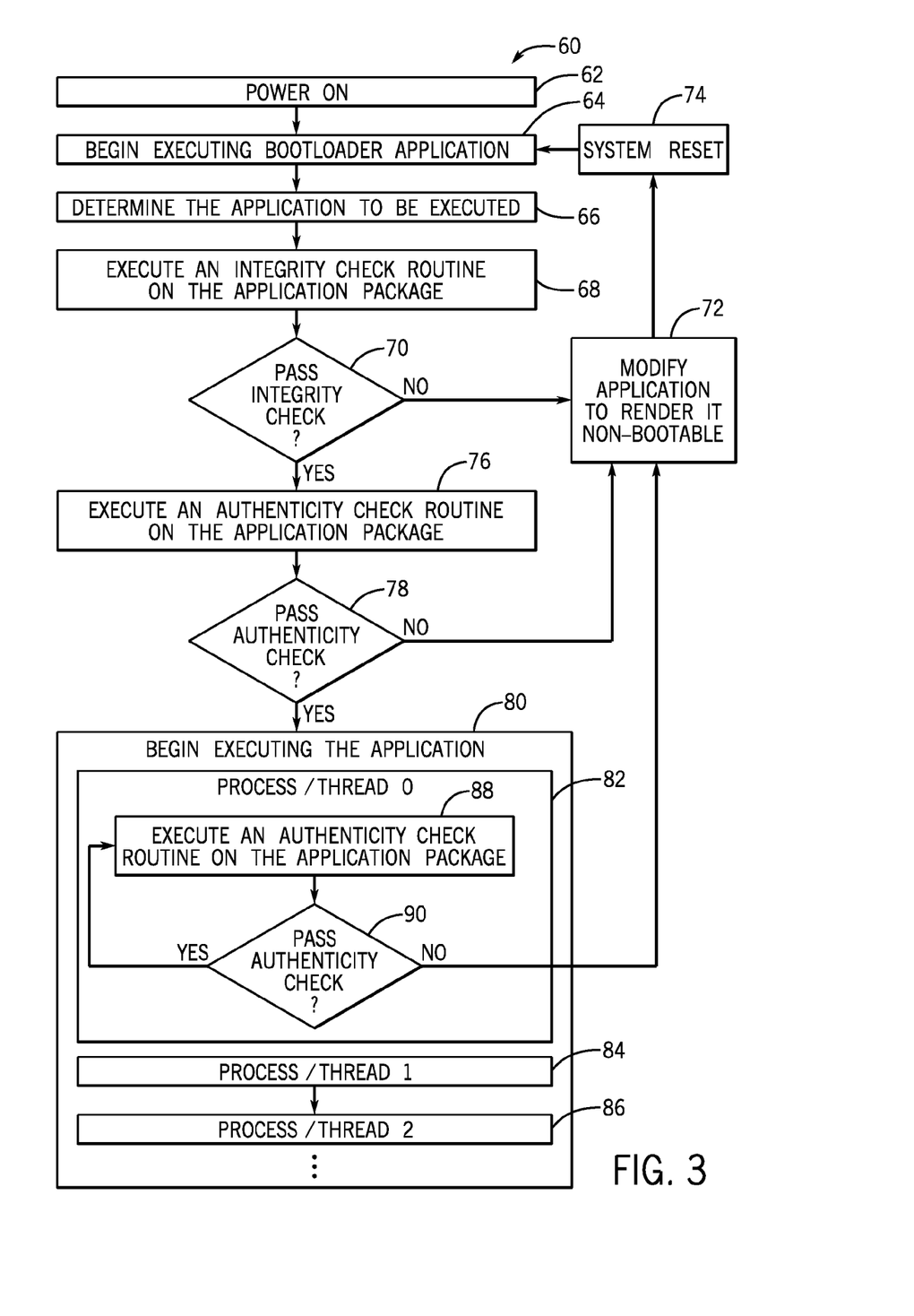
FIG. 3 is a flow diagram illustrating an embodiment of a boot process for the electronic device of FIG. 1.

With the foregoing in mind, FIG. 3 is a flow diagram illustrating an embodiment of a process 60 in which the electronic device 10 boots, verifies, and conditionally executes an application. The illustrated process 60 begins as the electronic device 10 is powered on (block 62). After powering on, the electronic device 10 may, in certain embodiments, perform one or more checks (e.g., a memory check of the memory circuitry 26, a voltage check of the processing circuitry 24) to verify the proper operation of the hardware components of the electronic device 10 before proceeding. Next, the processing circuitry 24 of the electronic device 10 may begin executing a bootloader application (block 64). The bootloader application may be a collection of instructions stored in the memory circuitry 26 and executable by the processing circuitry 24 of the electronic device 10 that enables an application to be selected, verified, and conditionally executed.

The processing circuitry 24 of the electronic device 10 executing the bootloader application may then determine (block 66) an application, stored in the memory circuitry 26, to be executed. For example, in certain embodiments, the bootloader application may prompt a user (e.g., using the I/O circuitry 32 discussed above) to select a particular application 28 stored in the memory circuitry 26 for execution. In other embodiments, the bootloader application may automatically select an application 28 to execute based on identifying information associated with the application 28 (e.g., name, size, version, or location in the memory circuitry 26).

Next, the illustrated process 60 continues as the processing circuitry 24 of the electronic device 10 executes (block 68) an integrity check routine on the package 27, which includes the application 28. In certain embodiments, the integrity check routine may be part of the bootloader application, or may be a separate routine called by the bootloader application. As used herein, an integrity check is a high-level check that generally ensures that the package 27 likely includes a legitimate application, but does not involve a bit-wise analysis of the contents of the package 27 or the application 28. For example, the integrity check may ensure that the package 27 is the appropriate file type (e.g., a zip file, or a tar file), that the package 27 includes a binary executable application 28 and a digest value 30, that the package 27 is the correct file size, that the package 27 conforms to the proper file naming standards, or other high-level checks. In certain embodiments, the integrity check routine may involve the computation and comparison of a checksum value (e.g., a cyclic redundancy check (CRC)) to verify the integrity of the package 27, as well as the application 28 stored therein.

If (block 70) the package 27 does not pass the integrity check, the processing circuitry 24 of the electronic device 10 may modify (block 72) the application 28 and/or the application package 27 to render it non-bootable. For example, if the integrity check routine of a bootloader application determines that the package 27 or the application 28 lacks integrity, then the bootloader application may modify the contents of the package 27 and/or the application 28 (e.g., insert a flag, modify the value of one or more bits, or erase the package 27 altogether) such that the bootloader will not attempt to execute the application 28 again. Subsequently, the bootloader causes the electronic device 10 to perform a system reset (block 74), enabling the electronic device to begin executing the bootloader application anew (block 64).

If, however (block 70), the package 27 does pass the integrity check, the processing circuitry 24 may then execute (block 76) an authenticity check routine on the package 27, which includes the application 28. An example of an authenticity check routine is discussed in detail below with respect to FIG. 4. In certain embodiments, the authenticity check routine of block 76 may be part of the bootloader application, or may be a separate routine called by the bootloader application. Regardless, as set forth below, the authenticity check routine generally performs a bit-wise analysis of the application 28 stored in the package 27 to determine if the application 28 matches the digest value 30 also stored in the package 27. As with the integrity check discussed above, if (block 78) the processing circuitry 24 of the electronic device 10 determines that the application 28 of the package 27 is not authentic, then the processing circuitry 24 may modify (block 72) the package 27 and/or the application 28 to render it non-bootable and initiate a system reset (block 74). In certain embodiments, the modification (block 72) of the application may be skipped when an application fails an integrity or authenticity check (e.g., blocks 70, 78, or 90), and the device may instead proceed directly to the system reset (block 74), which effectively prevents the device from executing the application in question without the modification of block 72.

If, however (block 78) the package 27 does pass the authenticity check, then the processing circuitry 24 may begin executing the application 28 (block 80). As illustrated in FIG. 3, during execution, the application 28 spawns an initial thread or process 82 (e.g., thread or process 0) in addition to other threads or processes 84 and 86. Additionally, in executing the initial thread 82 of the application 28, the processing circuitry 24 of the electronic device 10 may execute (block 88) an authenticity check routine to again verify the authenticity of the package 27 and the application 28. In other words, in certain embodiments, the application 28 includes an authenticity check routine that instructs the processing circuitry 24 of the electronic device 10 to verify the authenticity of the application 28 currently being executed. An example of an authenticity check routine is discussed in detail below with respect to FIG. 4. In certain embodiments, the processing circuitry 24 may include multiple processing units (e.g., processing cores), and a particular processing unit may be used or dedicated to the execution of the authenticity check routine of blocks 76 and/or 88. In certain embodiments, the processing circuitry 24 may include an HSM that executes the authenticity check routine. In certain embodiments, the authenticity check routine may be stored separately (e.g., in a separate memory device or a separate memory location) from the application 28. For example, in certain embodiments, the authenticity check routine may be performed by a hardware accelerator (e.g., a FPGA) that stores and executes instructions to perform an authenticity check routine of the application 28.

As set forth below, the authenticity check routine generally performs a bit-wise analysis of the application 28 stored in the package 27 to determine if the application 28 still matches the digest value 30 also stored in the package 27. As such, the authenticity check routine of blocks 78 and 88 enables the detection of even single-bit changes to the contents of the package 27 and the application 28 that may unintentionally occur (e.g., due to data corruption) or intentionally occur (e.g., due to an unauthorized access attempt) during execution of the application 28. As with the integrity check and the authenticity check performed by the bootloader above, if (block 90) the authenticity check routine determines that the application 28 is not authentic, then the processing circuitry 24 of the electronic device 10 may render the application 28 non-bootable (block 72) and/or initiate a system reset (block 74).

If, however (block 90), the processing circuitry 24 of the electronic device 10 successfully verifies the authenticity of the application 28, then the processing circuitry 24 may once again execute the authenticity check routine of block 88. In certain embodiments, the processing circuitry 24 may wait a set amount of time (e.g., between approximately 300 milliseconds and approximately 1 month, between approximately 1 second and approximately 1 week, between approximately 1 minute and approximately 1 day, or between approximately 1 hour and approximately 12 hours) or a random amount of time before re-executing the authenticity check of block 88, while in other embodiments, the processing circuitry 24 may immediately proceed with executing the authenticity check routine once more. In other embodiments, the thread 82 that includes block 88 may be continually executed throughout execution of the application 28. More specifically, in certain embodiments, the thread 82, which includes the authenticity check routine of block 88, may be executed concurrently with the other threads 84 and 86, but may be assigned a lower relative priority such that a thread handler gives preference to the execution of threads 84 and 86. In other words, in certain embodiments, the thread 82, which includes the authenticity check routine of block 88, may be readily preempted by the other threads 84 and 86, such that the thread 82 only executes when the other thread are waiting or sleeping. In this manner, the thread 82, including the authenticity check routine of block 88, may only execute during time periods when some or all of the processing circuitry 24 would otherwise sit idle.

Figure 4:
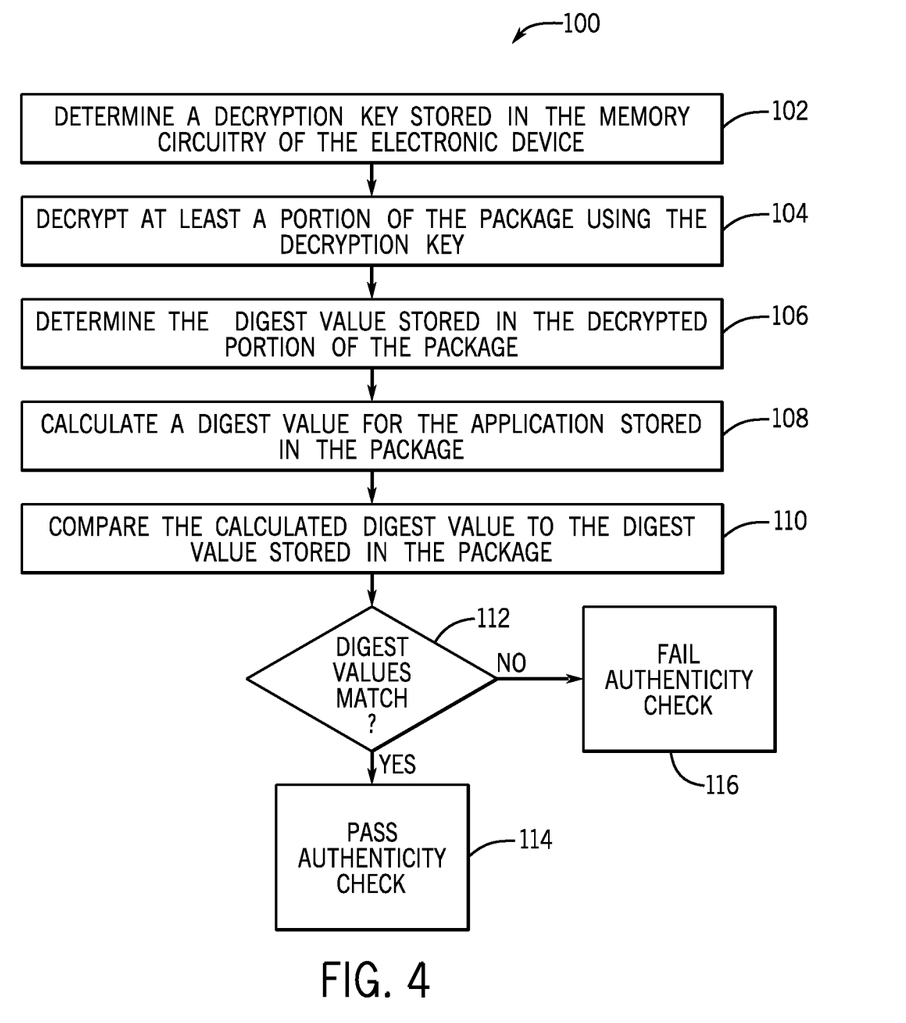
FIG. 4 is a flow diagram illustrating an embodiment of an application authenticity check routine.

FIG. 4 is a flow diagram illustrating an embodiment of a process 100 whereby the processing circuitry 24 of the electronic device 10 may execute an authenticity check routine to verify the authenticity of an application 28 contained with a package 27. As mentioned above, in certain embodiments, the authenticity check routine may include instructions stored in the memory circuitry 26 for execution by the processing circuitry 24, or instructions stored and executed by a portion of the processing circuitry 24 (e.g., an FPGA) to validate the application 28. The illustrated process 100 begins with the processing circuitry 24 determining (block 102) a decryption key stored in the memory circuitry 26 of the electronic device 10. As mentioned above with respect to FIG. 2, in certain embodiments, the package 27 may be partially or entirely encrypted using an encryption key associated with the manufacturer of the electronic device 10 or an authorized software supplier. For such embodiments, as mentioned above, during manufacturing of the electronic device 10, a corresponding key (e.g., a decryption key) may be stored in the memory circuitry 26 or the processing circuitry 24 (e.g., within an FPGA) of the electronic device 10, which enables the processing circuitry 24 to decrypt the encrypted portions of the package 27. For example, in certain embodiments, only the digest value 30 may be encrypted, while the remainder of the package 27 stored in the memory circuitry 26 may be unencrypted.

Accordingly, for embodiments in which the package 27 is at least partially encrypted, the processing circuitry 24 of the electronic device 10 may then decrypt (block 104) the encrypted portion of the package 27 using the decryption key determined in block 102. For example, the processing circuitry 24 may decrypt the digest value 30, the application 28, or both, as appropriate, using the decryption key. In certain embodiments, the processing circuitry 24 may utilize the HSM 25 or a hardware accelerator to perform one or more functions during the decryption process to improve security, efficiency, or both. Regardless, the processing circuitry 24 may then determine (block 106) the digest value 30 from the decrypted portion of the package 27. It may be appreciated that, for embodiments in which the package 27 is not encrypted, blocks 102 and 104 may be skipped and the digest value 30 may be directly read from the package 27 without further processing. However, it may generally be desirable for at least the digest value 30 within the package 27 to be encrypted to prevent the digest value 30 from being easily altered after creation of the package 27. Further, while encrypting the entire package 27 may provide greater security to the contents, it may be noted that a greater amount of processing power and time may be consumed by the electronic device 10 to successively decrypt the entire package 27, instead of just the digest value 30, with each execution of the process 100.

Next in the illustrated process 100 of FIG. 4, the processing circuitry 24 of the electronic device 10 may calculate (block 108) a digest value for the application 28 of the package 27. That is, the processing circuitry 24 of the electronic device 10 may digest the unencrypted application 28, using a cryptographic hash function (e.g., MD4, MD5, SHA-1, SHA-2, SHA-3, SHA-256), in order to determine a digest value. In certain embodiments, the processing circuitry 24 may utilize the HSM 25 or a hardware accelerator to perform the digestion for enhanced security or efficiency. Once the processing circuitry 24 has generated a calculated digest value, as described in block 108, the processing circuitry 24 of the electronic device 10 may compare (block 110) the calculated digest value to the digest value 30 from the decrypted portion of the package 27. If (block 112) the calculated digest value matches the digest value 30 that was determined from the package 27, then the authenticity check routine process 100 returns a successful result (block 114). If, however (block 112) the calculated digest value does not match the digest value 30 from the package 27, then the authenticity check routine process 100 returns an unsuccessful result (block 116).

It may be noted that portions of the process 100 illustrated in FIG. 4 may be fairly processor intensive. For example, blocks 104 and 108 describe actions that may involve the processing circuitry 24 of the electronic device 10 spending considerable amounts of processing time and energy to execute. As set forth above, in certain embodiments, the authenticity check routine illustrated by the process 100 may only execute when the processing circuitry 24 would otherwise be idle. In other words, in certain embodiments, the authenticity check routine of the application 28 may prevent the processing circuitry 24 of the electronic device 10 from entering an idle state, a throttled state, or a low-power sleep state. While this may result in the electronic device 10 consuming more power, operating the processing circuitry 24 in this manner makes a differential power analysis or an electromagnetic (EM) noise analysis of the electronic device 10 more difficult. That is, in certain embodiments, since the electronic device 10 does not enter an idle state or a low-power sleep state, an unauthorized party attempting to determine when (during operation of the electronic device 10) and where (in the memory circuitry 26 and/or the processing circuitry 24) to attack the electronic device 10 based on an analysis of the power consumption of the electronic device 10 would only see generally uniform power consumption over time. Similarly, in certain embodiments, since the processing circuitry 24 may be continually active, an unauthorized party attempting to determine when and where to attack the electronic device 10 based on an analysis of the EM noise generated by the electronic device 10 would only see a generally uniform EM noise level over time. As such, the unauthorized party is greatly impaired in gaining unauthorized access to the electronic device 10.

Technical effects of the invention include enabling an electronic device to verify that stored instructions have not been modified after the instructions are packaged or during execution of the instructions. That is, present embodiments provide a mechanism whereby the authenticity of stored application packages may be continually, regularly, or sporadically verified, even during execution of the stored application itself. In certain embodiments, this authenticity check routine may be executed by the processing circuitry of the electronic device during otherwise idle processing time, rendering the electronic device more robust to thwart differential power analysis and/or EM noise analysis techniques. Accordingly, present embodiments enable the regular authenticity verification of an application in a manner that obfuscates the activities of the electronic device from an unauthorized party, resulting in enhanced security during operation of the electronic device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  an electronic device, comprising:
    memory circuit configured to store an application comprising a plurality of instructions; and
    processing circuitry configured to execute the application and an application authenticity check routine, wherein:
      the application authenticity check routine includes instructions executable by the processing circuitry to use idle processing time to verify an authenticity of the application throughout execution of the application,
      the application comprises at least one encoded set of instructions, and the authenticity of the application is verified using a bitwise analysis of the at least one encoded set of instructions, and
      executing the authenticity check routine causes the processing circuitry to consume a constant amount of power, or
      executing the application causes the processing circuitry to emit a constant amount of electromagnetic radiation.

2. The system of claim 1, wherein the application authenticity check routine comprises instructions executable by the processing circuitry to determine that the application is authentic when a calculated digest value for the application matches a digest value stored in the application.

3. The system of claim 2, wherein the application authenticity check routine comprises instructions executable by the processing circuitry to alter the application to render the application non-executable by the processing circuitry and to restart the electronic device when the processing circuitry determines that the calculated digest value for the application does not match the digest value stored in the application.

4. The system of claim 1, wherein the processing circuitry comprises a high-security module (HSM), and wherein the HSM is configured to execute the application authenticity check routine to verify the authenticity of the application being executed by other portions of the processing circuitry.

5. The system of claim 1, wherein the processing circuitry includes a field-programmable gate array (FPGA) that is configured to store and execute the application authenticity check routine to verify the authenticity of the application being executed by other portions of the processing circuitry.

6. The system of claim 1, wherein the application authenticity check routine is configured to make an energy consumption and an electromagnetic (EM) noise level of the electronic device substantially uniform throughout execution of the application.

7. The system of claim 1, wherein the application authenticity check routine is stored in the memory circuitry.

8. The system of claim 1, wherein the electronic device comprises a relay of an industrial monitoring and/or control system, and wherein the industrial monitoring and/or control system comprises a power grid system, a protection and control system, an industrial plant, a power distribution system, or any combination thereof.

9. A method, comprising:
  instructing processing circuitry of an electronic device to initiate execution of an application stored in a memory of the electronic device, wherein the application comprises at least one encoded set of instructions;
  executing the application, while executing an authenticity check routine of the application, using the processing circuitry of the electronic device, wherein the authenticity check routine comprises a plurality of instructions configured to cause the processing circuitry to use idle processing time of the processing circuitry to determine whether the application has been modified subsequent to packaging, by performing a bitwise analysis of the at least one encoded set of instructions; and
  instructing the processing circuitry of the electronic device to:
    consume a constant amount of power while executing the authenticity check routine, or
    emit a constant amount of electromagnetic radiation while executing the application.

10. The method of claim 9, comprising modifying the application in the memory of the electronic device to render the application non-executable when the processing circuitry determines that the application has been modified subsequent to packaging.

11. The method of claim 10, comprising restarting the electronic device after modifying the application when the processing circuitry determines that the application has been modified subsequent to packaging.

12. The method of claim 10, wherein the electronic device comprises a relay of an industrial monitoring and/or control system.

13. The method of claim 10, wherein executing the authenticity check routine comprises executing the authenticity check routine using available processing cycles of the processing circuitry of the electronic device while the processing circuitry is executing the application.

14. The method of claim 10, wherein executing the authenticity check routine comprises executing the authenticity check routine sporadically at intervals between approximately 300 milliseconds and approximately 1 month.

15. The method of claim 10, wherein executing the authenticity check routine comprises not allowing the processing circuitry of the electronic device to become idle or to be throttled while executing the application.

16. The method of claim 10, wherein executing the authenticity check routine comprises causing the electronic device to emit a substantially uniform amount of electromagnetic noise throughout execution of the application.

17. A non-transitory, computer-readable medium storing instructions executable by at least one processor of an electronic device, the instructions comprising:

instructions to execute an application stored in at least one memory of the electronic device, wherein the application comprises at least one encoded set of instructions;

instructions to intermittently execute an authenticity check routine while executing the application, wherein the authenticity check routine comprises:

instructions to compute a digest value for the application stored in the at least one memory of the electronic device;

instructions to decrypt a portion of the application stored in the at least one memory of the electronic device to determine a stored digest value for the application;

instructions to cause the at least one processor to use idle processing time to determine that the application is authentic whenever the at least one processor determines that the computed digest value is equal to the stored digest value, by performing a bitwise analysis of the at least one encoded set of instructions; and instructions to cause the at least one processor to:

consume a constant amount of power while executing the authenticity check routine, or emit a constant amount of electromagnetic radiation while executing the application.

18. The medium of claim 17, wherein the authenticity check routine comprises instructions to restart the electronic device whenever the computed digest value is not equal to the stored digest value.

19. The medium of claim 17, wherein the at least one processor comprises a high-security module (HSM) or a field-programmable gate array (FPGA) configured to execute the authenticity check routine and another processor configured to execute the application.

* * * * *